(12) United States Patent  (10) Patent No.: US 8,831,395 B2
Sievers et al.  (45) Date of Patent: Sep. 9, 2014

(54) CABLE PULLING ARRANGEMENT (71) Applicants: Scott C. Sievers, Jordan, MN (US);
Soutsada Vongseng, Chanhassen, MN (US)

(72) Inventors: Scott C. Sievers, Jordan, MN (US);
Soutsada Vongseng, Chanhassen, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 13/676,676

(22) Filed: Nov. 14, 2012

(65) Prior Publication Data
US 2013/0177284 A1  Jul. 11, 2013

Related U.S. Application Data (60) Provisional application No. 61/559,446, filed on Nov. 14, 2011.

(51) Int. Cl.
G02B 6/44 (2006.01)
G02B 6/54 (2006.01)

(52) U.S. Cl.
USPC ............................ 385/135; 385/136; 385/139

(58) Field of Classification Search
CPC ...... G02B 6/4465; G02B 6/54; G02B 6/4471; H02G 1/081
USPC .................................................. 385/136, 139
See application file for complete search history.

(56) References Cited

U.S. PATENT DOCUMENTS

| | | |
|---|---|---|
| 3,672,006 A | 6/1972 | Fidrych |
| 4,368,910 A | 1/1983 | Fidrych |
| 4,453,291 A | 6/1984 | Fidrych |
| 4,684,211 A | 8/1987 | Weber et al. |
| 5,013,125 A | 5/1991 | Nilsson et al. |
| 5,133,583 A | 7/1992 | Wagman et al. |
| 5,480,203 A | 1/1996 | Favalora et al. |
| 5,863,083 A | 1/1999 | Giebel et al. |
| 5,938,180 A | 8/1999 | Walsten |
| RE36,592 E | 2/2000 | Giebel et al. |
| 6,101,305 A | 8/2000 | Wagman et al. |
| 6,266,469 B1 | 7/2001 | Roth |
| 6,944,389 B2 | 9/2005 | Giraud et al. |
| 6,993,237 B2 | 1/2006 | Cooke et al. |
| 7,200,316 B2 | 4/2007 | Giraud et al. |
| 7,461,981 B2 * | 12/2008 | Yow et al. ............ 385/76 |
| 8,422,847 B2 | 4/2013 | Kowalczyk et al. |
| 8,500,341 B2 | 8/2013 | Zimmel et al. |
| 8,565,572 B2 | 10/2013 | Krampotich et al. |
| 8,620,129 B2 | 12/2013 | Rudenick et al. |
| 2010/0322584 A1 | 12/2010 | Kowalczyk et al. |
| 2012/0308184 A1 * | 12/2012 | Pina et al. ............ 385/102 |

* cited by examiner

Primary Examiner — Omar Rojas
(74) Attorney, Agent, or Firm — Merchant & Gould P.C.

(57) ABSTRACT

Certain types of fiber optic cable assemblies include a fiber optic cable; and a cable pulling assembly coupled to one end of the fiber optic cable. The fiber optic cable includes optical fibers and a first fanout arrangement at which the optical fibers are transitioned from a multi-fiber cable section to connectorized pigtails. Some example cable pulling assemblies include an enclosure defining a cavity in which the second end of the fiber optic cable is disposed. A first end of the enclosure surrounds the first fanout arrangement. A second end of the enclosure is folded into a loop. A first cable tie arrangement secures the second end of the enclosure in the loop. At least a second cable tie extends through opposite side holes in the first fanout arrangement and through both top and bottom portions of the enclosure.

24 Claims, 6 Drawing Sheets

CABLE PULLING ARRANGEMENT

CROSS REFERENCE TO RELATED APPLICATIONS

This application claims the benefit of U.S. Provisional Application No. 61/559,446, filed Nov. 14, 2011, and titled "Cable Pulling Arrangement," the disclosure of which is hereby incorporated herein by reference.

BACKGROUND

As demand for telecommunications increases, fiber optic networks are being extended in more and more areas. To connect fiber optic equipment in different geographical locations, fiber optic cables may be routed through conduits or other enclosed spaces (e.g., aerial tracks, underground pipes, support structures disposed inside walls, etc.). Management of the cables, ease of navigating the cables through the various conduits, and ease of connecting the cables at the equipment are important concerns. As a result, there is a need for fiber optic devices and methods which address these and other concerns.

SUMMARY

An aspect of the present disclosure relates to a fiber optic cable assembly including a fiber optic cable and a cable pulling assembly. The fiber optic cable includes a fanout arrangement that separates a multi-fiber into connectorized pigtails. The pulling assembly includes a mesh enclosure surrounding the fanout arrangement and connectorized pigtails. The fanout arrangement is axially secured to a first end of the mesh. A second end of the mesh forms a pulling loop. Cable ties secure the fanout arrangement to the mesh enclosure by extending both through and around the fanout arrangement.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
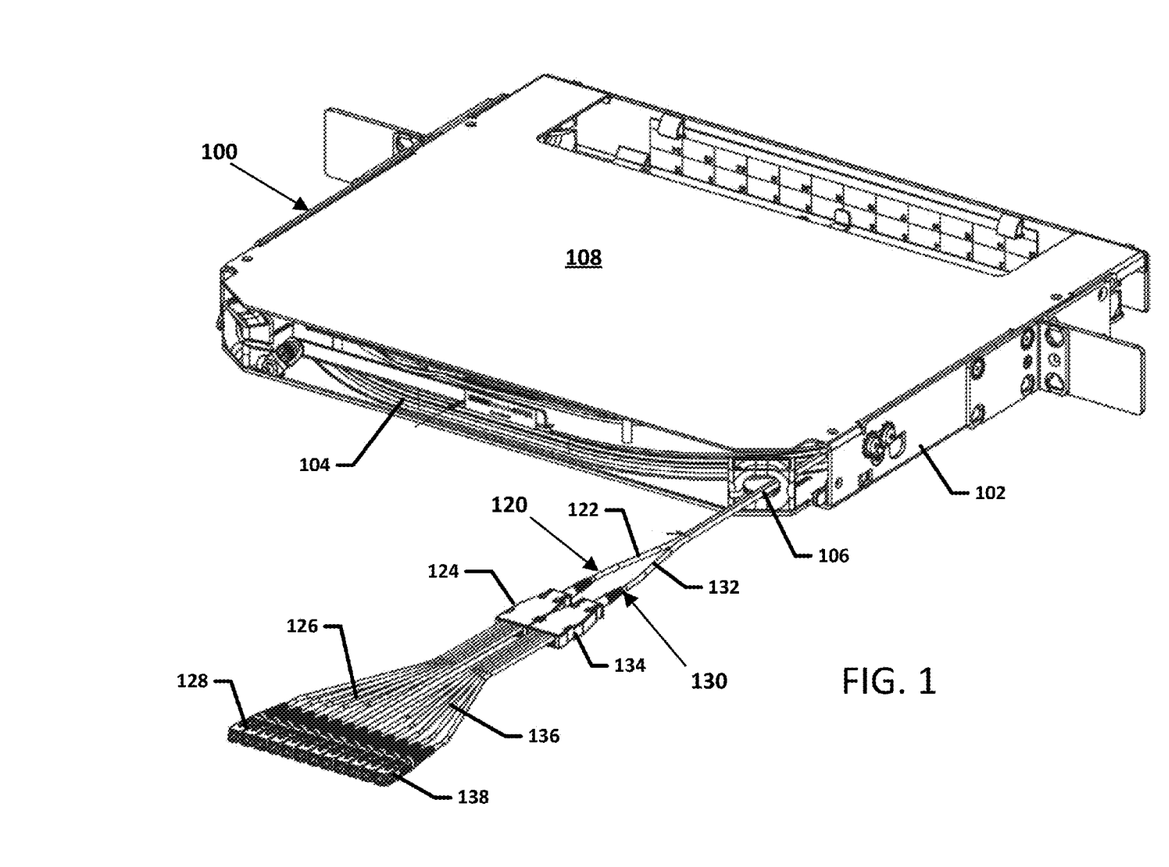
FIG. 1 is a perspective view of a telecommunications device having first and second example fiber optic cables extending therefrom in accordance with the principles of the present disclosure.

Referring now to FIGS. 1, a telecommunications device 100 is shown. The telecommunications device 100 is configured for mounting to a rack of an optical distribution frame. The telecommunications device 100 includes an enclosure 102 and a telecommunications component 104 mounted within the enclosure 102. In the depicted embodiment, the telecommunications component 104 is a spool. The spool 104 rotates relative to the enclosure 102. In certain implementations, the enclosure 102 further includes a cover 108. The cover 108 is configured to slide relative to the enclosure 102 between an uncaptured position and a captured position.

At least a first fiber optic cable 120 is wrapped around the spool 104. In the example shown, a second fiber optic cable 130 also is wrapped around the spool 104. The fiber optic cables 120, 130 may be paid out from the spool 104 through a port 106 defined in the enclosure 102. Each of the fiber optic cables 120, 130 includes a first section 122, 132 containing multiple optical fibers. In certain implementations, the multiple optical fibers of the first section 122, 132 form a ribbon fiber arrangement. In other implementations, the fibers are loose within the first sections 122, 132 of the cables 120, 130.

Each of the fiber optic cables 120, 130 also includes a fanout arrangement 124, 134 that extends from a first end to a second end. Each fanout arrangement 124, 134 receives the first section 122, 132 of the respective cable 120, 130 at the first end of the fanout arrangement 124, 134, transitions the fibers from the first section 122, 132 to separate pigtails 126, 136, the outputs the pigtails 126, 136 from the second end of the fanout arrangement 124, 134. Of course, optical signals pass in both directions along the cables 120, 130. The terms "receive" and "output" are used for convenience and are not intended to imply that optical signals are carried only in one direction through the fanout arrangement 124, 134. In the example shown, each of the pigtails 126, 136 is terminated at a respective fiber optic connector 128, 138.

In some implementations, the pigtails 126, 136 are terminated by SC-type fiber optic connectors 128, 138. In other implementations, the fiber optic connectors 128, 138 terminating the pigtails 126, 136 are LC-type fiber optic connectors. In other implementations, the fiber optic connectors 128, 138 terminating the pigtails 126, 136 are LX.5-type fiber optic connectors. In other implementations, the fiber optic connectors 128, 138 terminating the pigtails 126, 136 are ST-type fiber optic connectors. In other implementations, the fiber optic connectors 128, 138 terminating the pigtails 126, 136 are FC-type fiber optic connectors. In still other implementations, the first sections 122, 132 are terminated by multi-fiber connectors (e.g., MPO-type connectors) without being routed through any fanouts.

In some implementations, the first section 122, 132 of one or both of the cables 120, 130 is terminated by a multi-fiber connector (e.g., an MPO-type connector). For example, in certain implementations, the first section 122, 132 of one or both of the cables 120, 130 is terminated by multiple multi-fiber connectors (e.g., MPO-type connectors). In other implementations, the first section 122, 132 of one or both of the cables 120, 130 is terminated by multiple single fiber optical connectors (e.g., SC-type optical connectors, LC-type optical connectors, FC-type optical connectors, ST-type optical connectors, LX.5-type optical connectors, etc.). For example, in certain implementations, second fanout arrangements may be disposed at opposite ends of the first sections 122, 132 to separate the optical fibers into additional connectorized pigtails.

Figure 1A:
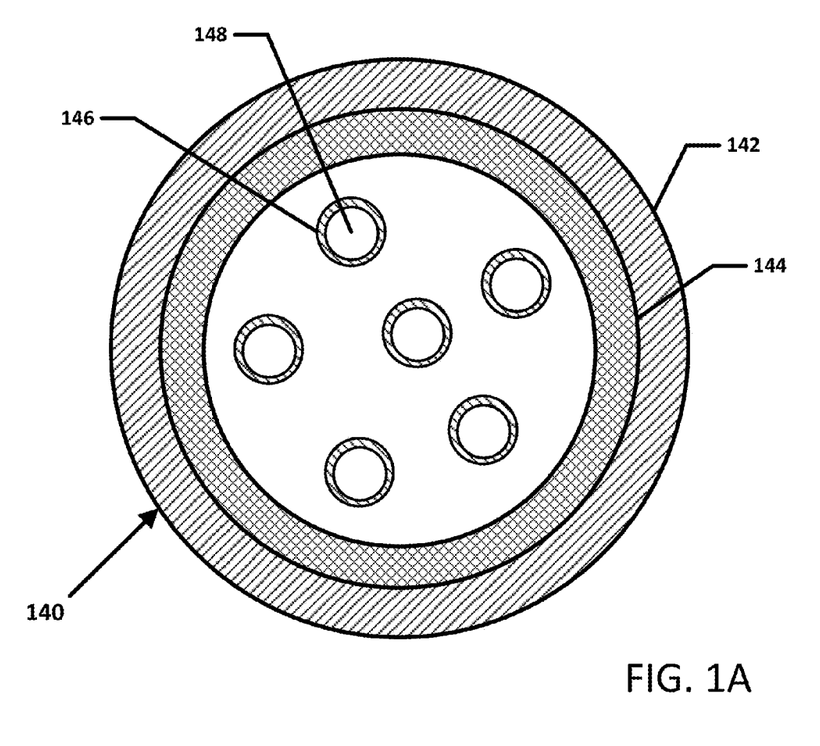
FIG. 1A is a lateral cross-sectional view of an example fiber optic cable including a jacket, a strength layer, and a plurality of optical fibers.

FIG. 1A is a lateral cross-sectional view of an example fiber optic cable 140 suitable for use as the first optical cable 120 or the second optical cable 130. The example fiber optic cable 140 includes a jacket 142 surrounding a plurality of optical fibers 148. In some implementations, the fibers 148 are disposed in a loose configuration within the cable 140. In the example shown, the loose fibers 148 are disposed in buffer tubes 146. In other implementations, the fibers 148 may be arranged in a matrix or ribbon.

A strength member 144 also is disposed within the jacket 142. In certain implementations, the strength member 144 includes a layer of aramid yarn (e.g., Kevlar®) surrounding the fibers 148 and extending along the length of the cable 140. The strength layer 144 imparts axial or tensile strength to the cable 140 so that the cable 140 may better withstand a pulling force without breaking. In certain implementations, the strength layer 144 is anchored to the fanout arrangements 124, 134. In other implementations, the cable 140 may include one or more strength rods or other types of strength members.

Figure 2:
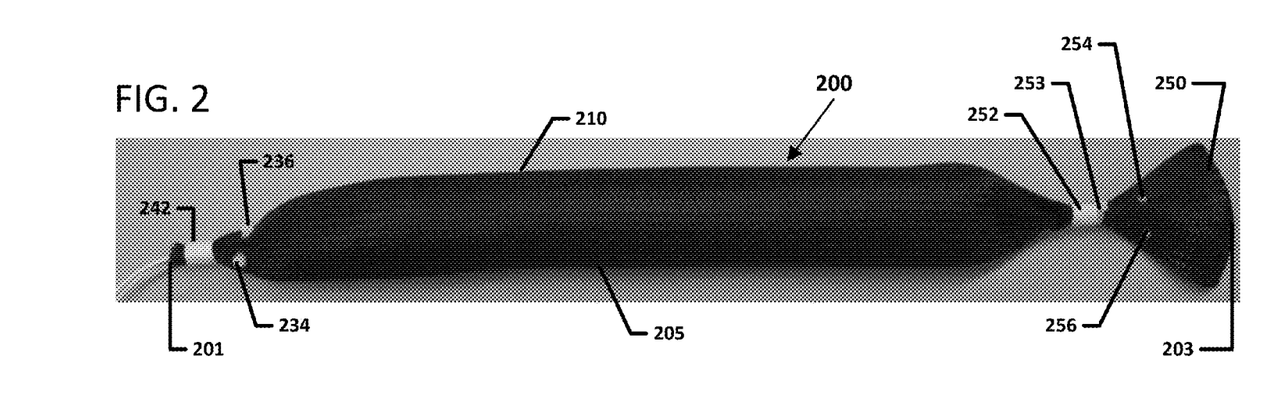
FIG. 2 is a top plan view of an example pulling assembly having features that are examples of inventive aspects of the present disclosure including an enclosure and a fanout securement arrangement in accordance with the principles of the present disclosure.

FIG. 2 shows an example cable pulling assembly 200 that is configured to be disposed at the second end of one or more fiber optic cables 120, 130. In the example shown, the cable pulling assembly 200 is configured to protect both fiber optic cables 120, 130. In other implementations, however, separate cable pulling assemblies 200 may be installed at each fiber optic cable 120, 130. In still other implementations, the cable pulling assembly 200 may hold connectorized ends of three or more fiber optic cables. The example cable pulling assembly 200 forms an elongated body 205 extending from a first end 201 to a second end 203.

The body 205 is configured to accommodate the fanout arrangements 124, 134 of the fiber optic cables 120, 130 at the first end 201. The body 205 of the pulling assembly 200 is secured to the fanout arrangements 124, 134. Accordingly, a pulling force applied to the body 205 in an axial direction will be imparted to the fanout arrangements 124, 134. If the optical cable includes a strength layer (e.g., strength layer 144 of FIG. 1A), then the fanout arrangement 124, 134 will transfer the pulling force to the strength layer as the cable is pulled, thereby protecting the optical fibers within the cables 120, 130.

In some implementations, the body 205 of the cable pulling assembly 200 is sized to accommodate the fanout arrangement 124, pigtails 126, and connectors 128 of a single cable 120. For example, in some implementations, the body 205 may have a length sufficient to enable the pigtails 126 to extend fully along the length of the body 205. In other implementations, the body 205 is sized so that the pigtails 126 extend along the length of the body 205 from the fanout arrangement 124 towards the second end 202 and then loop back towards the fanout arrangement 124.

The body 205 of the pulling assembly 200 is formed from an enclosure 210. The enclosure 210 extends from the first end 201 of the body 205 to a second end 202. A pulling loop 250 is formed using the second end 202 of the enclosure 210. The distal end of the loop 250 defines the second end 203 of the body 205 of the pulling assembly 200. In some implementations, the enclosure 210 is formed from a mesh fabric. In certain implementations, mesh fabric is formed in a generally tubular shape (e.g., an elongated circumferential wall having opposite open ends). For example, the enclosure 210 may be formed from an interwoven fabric (e.g., nylon strands) that enables the enclosure 210 to stretch laterally more than axially. In other implementations, the mesh fabric may be wrapped or folded to form the enclosure 210.

As shown in FIG. 2, a first length of tape 242 is wrapped around the enclosure 210 at the first end 201 to close the enclosure 210 and a second length of tape 252 is wrapped around the enclosure 210 at the second end 202 of the enclosure 210 to form the loop 250. The packaged portions of the cables 120, 130 are disposed within an interior 212 of the enclosure defined between the lengths of tape 232, 252 (see FIG. 3). A first cable tie 253 cooperates with the tape 252 to secure the formation of the loop 250 at the second end 203 of the pulling assembly 200.

Figure 3:
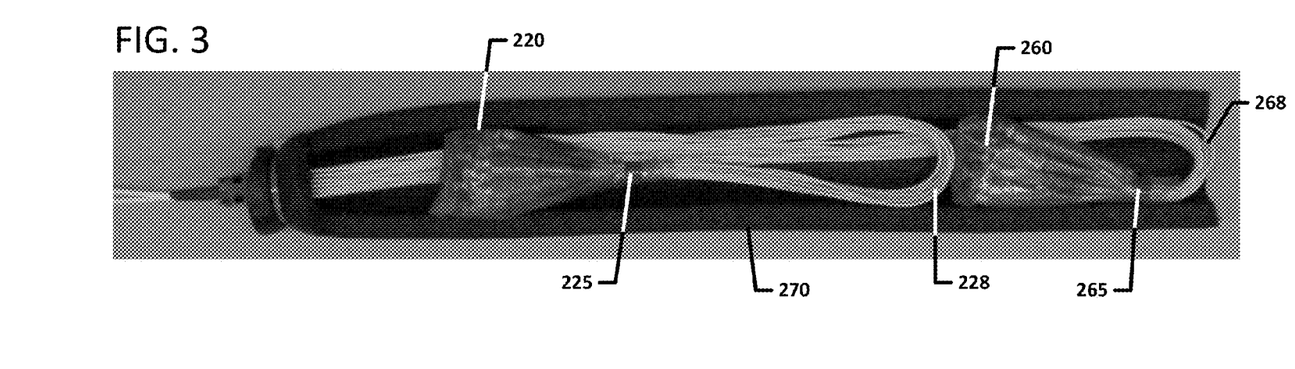
FIG. 3 shows the example pulling assembly of FIG. 2 with first and second ends removed and a strip of the enclosure removed to reveal cable components disposed within an interior of the cable pulling assembly.

As shown in FIG. 3, the connectors 128, 138 of the cables 120, 130 are disposed within bags 220, 260, respectively. In some implementations, the bags 220, 260 are antistatic bags 220, 260. In certain implementations, the bag 220 is at least partially transparent. In one example, the bag 220 is opaque. In some implementations, the bags 220, 260 are disposed so that the connectors 128, 138 face in the same direction. In certain implementations, the bags 220, 260 are disposed so that the connectors 128, 138 face towards the front end 201 of the enclosure 210.

Figure 7:
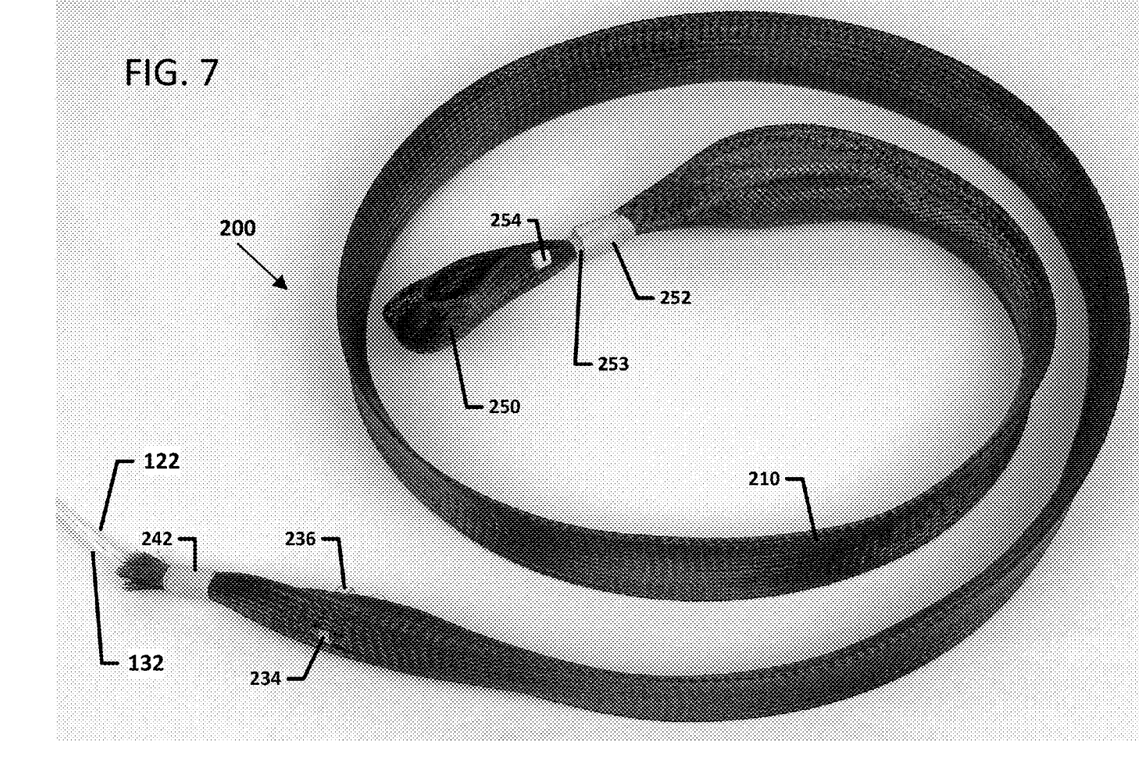
FIG. 7 is a perspective view of a loosely coiled pulling assembly enclosing a plurality of connectorized pigtails of first and second optical cables.

In some implementations, the location of each bag 220, 260 is axially staggered within the enclosure interior 212 relative to the other bag 220, 260. Such staggering reduces the diameter of the body 205 and may protect the connectors 128, 138. In the example shown, the first cable 120 is looped within the enclosure interior 212 so that the bag 220 is disposed within a front half of the interior 212. The second cable 130 is looped within the enclosure interior 212 so that the bag 260 is disposed within a rear half of the interior 212. In other implementations, the bags 220, 260 may be disposed within the enclosure 210 without looping the cables 120, 130 back towards the front 201 of the enclosure 210. For example, FIG. 7 shows an enclosure 210 with cable connectors (e.g., connectors 128, 138) disposed adjacent the cable loop 250.

In some implementations, the cable pulling assembly 200 includes a layer of padding 270 disposed between the enclosure 210 and the cables 120, 130. For example, the layer of padding 270 may be formed from polyethylene foam. In other implementations, other types of foam may form the insulating layer 270. In certain implementations, a zip tie may be wrapped around one end of the foam insulating layer (e.g., see FIG. 3). In certain implementations, the padding layer 270 includes a foam tube into which the cables 120, 130 are slid. In other implementations, the padding layer 270 includes bubble wrap surrounding the connectors 128, 138 and disposed within the enclosure 210. In still other implementations, the mesh enclosure 210 surrounds the cables 120, 130 without a padding layer 270 (e.g., see FIG. 7).

Figure 4:
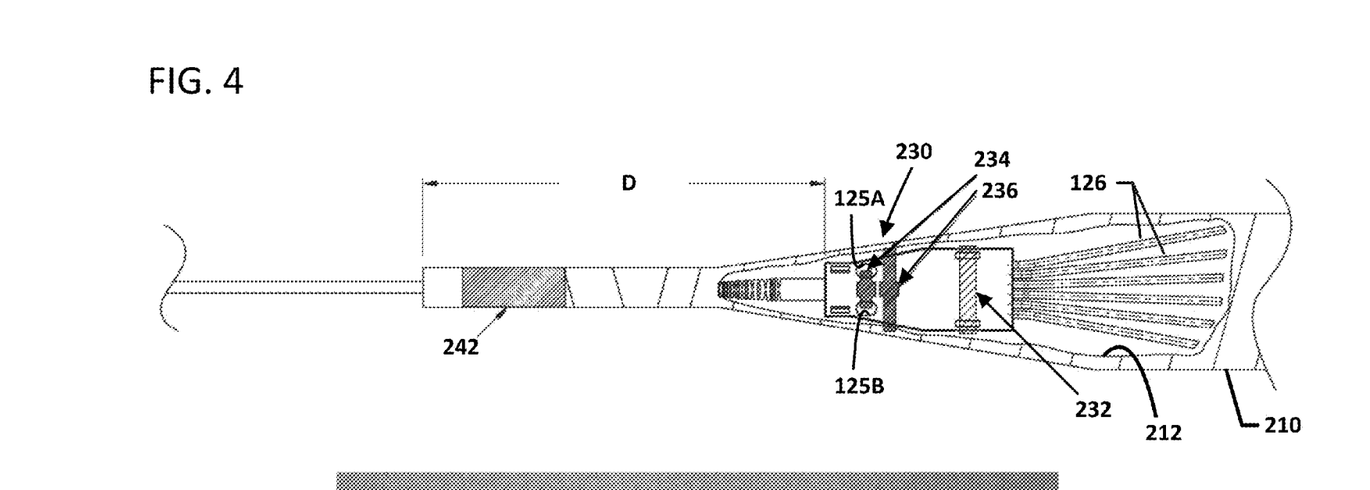
FIG. 4 is an enlarged view of the first end of the pulling assembly of FIG. 7 with a section of the enclosure removed to reveal the fanout securement arrangement.
Figure 5:
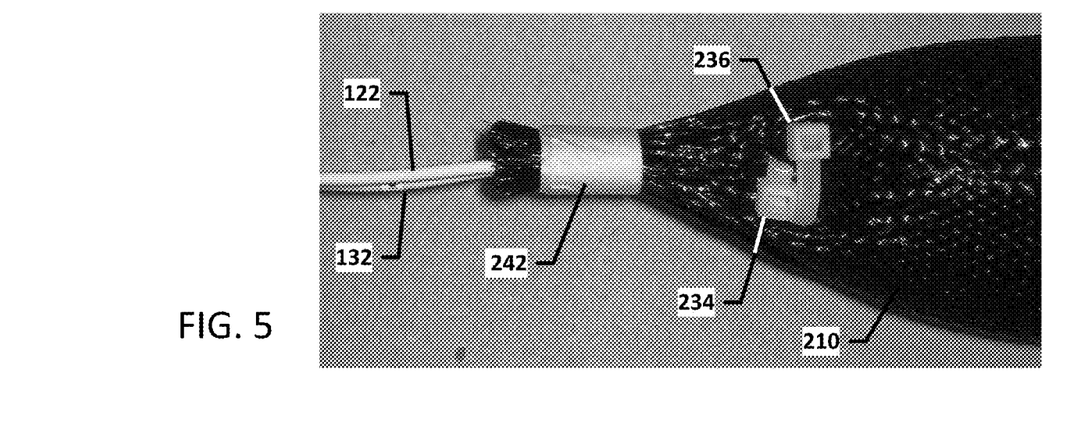
FIG. 5 is an enlarged view of a first end of the pulling assembly of FIG. 2 in accordance with the principles of the present disclosure.

As shown in FIG. 4, a fanout securement arrangement 230 retains the fanout arrangements 124, 134 at the first end 201 of the pulling assembly 200. For example, the fanout securement arrangement 230 may retain the fanout arrangements 124, 134 against axial movement within the enclosure 210. In certain implementations, the fanout securement arrangement 230 includes a length of tape 232 that is wrapped around the bodies of the fanout arrangements 124, 134 to secure the fanout arrangements 124, 134 together. The tape 232 may retain the fanout arrangements 124, 134 at a common axial position relative to each other.

In some implementations, the fanout securement arrangement 230 includes a first cable tie 234 that passes through holes in the mesh walls of the enclosure 210 and that passes through holes defined in the fanout arrangements 124, 134. In the example shown in FIG. 4, the fanout arrangement 124 defines a first side hole 125A and a second side holes 125B disposed on opposite sides of the fanout arrangement 124. In certain implementations, the side holes 125A, 125B are disposed at the first end of the fanout arrangement 124, 134. In other implementations however, the side holes 125A, 125B may be defined through any place on the fanout arrangements 124, 134.

Certain types of fanout securement arrangements 230 also include a second cable tie 236 that also passes through holes in the mesh walls of the enclosure 210, but that passes around the fanout arrangements 124, 134. In some implementations, the second cable tie 236 is disposed between the first cable tie 234 and the tape 232. In certain implementations, the second cable tie 236 is disposed closer to the first cable tie 234 than to the length of tape 232. In certain implementations, the second cable tie 236 is disposed around sidewalls of the fanout arrangements 124, 134 that taper outwardly towards the tape 232. Such tapering may inhibit the cable tie 236 from being pulled axially off the fanout arrangements 124, 134. In other implementations, however, the components of the fanout securement arrangement 230 may be disposed in any order along the length of the fanout arrangements 124, 134.

One example process by which the cable pulling assembly 200 may be installed at the connectorized end of an example cable 120 is disclosed herein. Of course, the pulling assembly 200 may be installed over the connectorized ends of two or more cables (e.g., cable 120 and cable 130). Once installed, the cable pulling assembly 200 may be utilized to facilitate moving (e.g., pulling) of the cable(s) through a tube or other conduit. For example, the pulling assembly 200 may be slid along a conduit by pulling one the loop 250 at the second end 203 of the assembly 200.

In some implementations, the pulling assembly installment process includes placing the pigtail connectors 128 of the cable 120 in an antistatic bag 220. An open end of the bag 220 is secured shut against the pigtails 126 using tape 225 or another winding member (e.g., string, cable tie, etc.). The bag 220, the pigtails 126, and the fanout arrangement 124 are disposed within a pulling enclosure 210. In certain implementations, a mesh tubing is slid over the bag 220, pigtails 126, and fanout arrangement 124 to form the pulling enclosure 210. In other implementations, a mesh is wrapped around the bag 220, pigtails 126, and fanout arrangement 124 to form the pulling enclosure 210. In still other implementations, the antistatic bag 220, the pigtails 126, and the fanout arrangement 124 are disposed within a mesh bag to form the pulling enclosure 210.

In some implementations, the bag 220, the pigtails 126, and the fanout arrangement 124 are disposed so that the first end 201 of the pulling enclosure 210 extends at least a distance D (FIG. 4) beyond the fanout arrangement 124. In certain implementations, the distance D is about three inches. In other implementations, the distance D may be greater or less than three inches (one inch, two inches, four inches, five inches, etc.). The first end 201 of the pulling enclosure 210 is substantially closed by tightening the first end 201 around the first section 122 of cable 120. In some implementations, the first end 201 of the enclosure 210 is gathered together or wrapped around the first cable section 122 and secured using tape 242. For example, in certain implementations, a section of tape 242 may be wound around the gathered or wrapped first end 201 of the enclosure. In one example implementation, the tape 242 may be wound about eleven times around the first end 201. In other implementations, the tape 242 may be wound a greater or lesser number of times (e.g., once, four times, fifteen times, etc.).

A fanout securement arrangement 230 secures the fanout arrangement 124 to the enclosure 210. For example, in certain implementations, the fanout securement arrangement 230 inhibits axial movement of the fanout arrangement 124 within the enclosure 210. In some implementations, the fanout securement arrangement 230 includes at least a first cable tie 234. In certain implementations, the fanout securement arrangement 230 includes a first cable tie 234 and a second cable tie 236. Each cable tie 234, 236 has a locking end and a distal end.

The distal end of the first cable tie 234 is inserted through a top of the enclosure 210 (e.g., through one or more holes in the mesh) from an exterior of the enclosure 210 to an interior of the enclosure 210. The distal end of the first cable tie 234 is then inserted through a first side hole 125A extending through the fanout arrangement 124. The first distal end then passes through a bottom of the enclosure 210 from the interior of the enclosure 210 to an exterior of the enclosure 210. The first distal end of the first cable tie 234 is then looped back to pass through the bottom of the enclosure 210, a second side hole 125B of the fanout arrangement 124, and the top of the enclosure 210. The distal end of the first cable tie 234 is locked at the locking end of the first cable tie 234 to secure the fanout arrangement 124 axially within the enclosure 210.

In some implementations, the distal end of the second cable tie 236 is passed through the top of the enclosure 210, past a first side of the fanout arrangement 124, through the bottom of the enclosure 210, and looped back through the bottom of the enclosure 210, past a second side of the fanout arrangement 124, and through the top of the enclosure 210. The distal end of the second cable tie 236 is locked at the locking end of the second cable tie 236 to further secure the fanout arrangement 124 axially within the enclosure 210.

Figure 6:
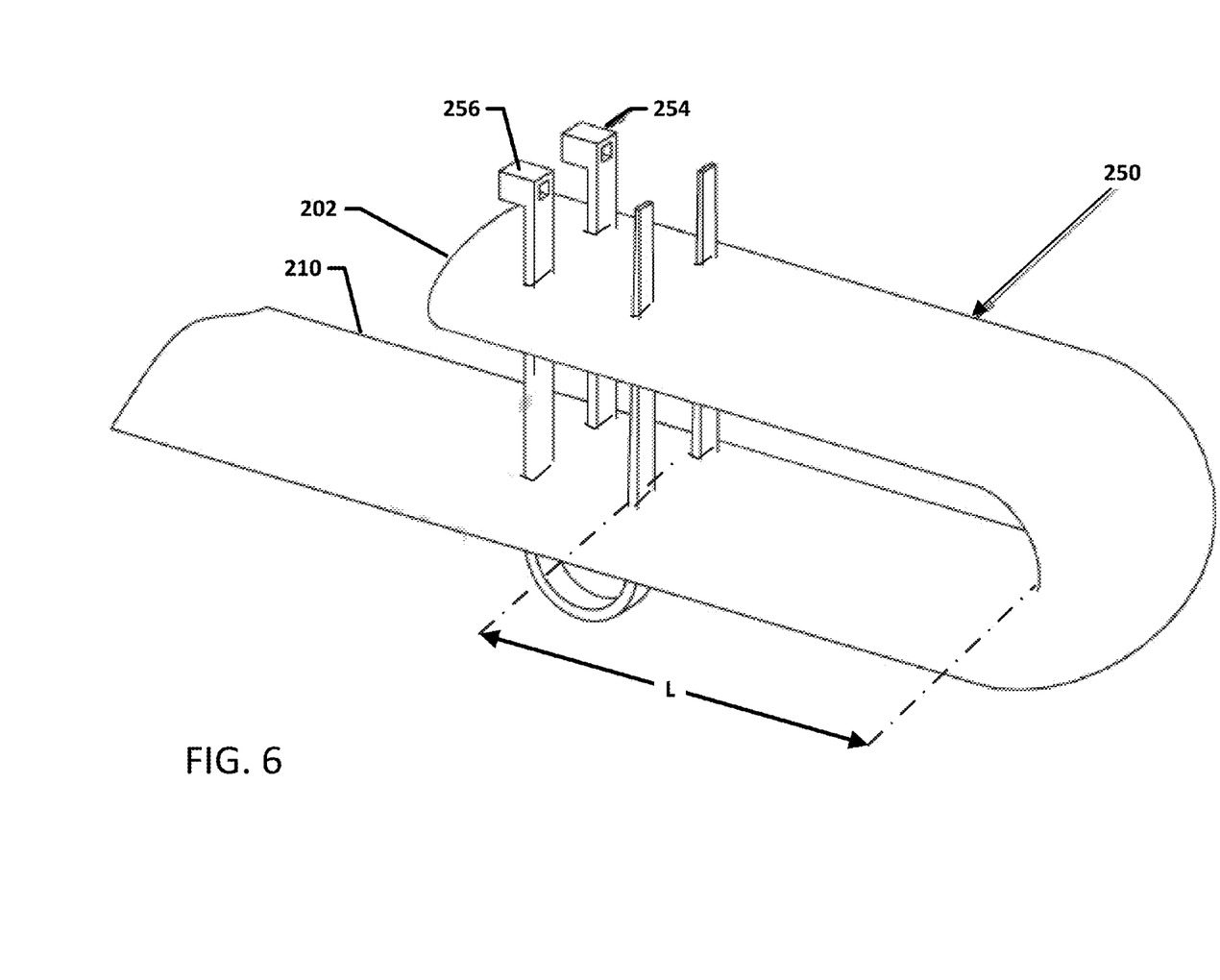
FIG. 6 is a perspective view of a second end of an example pulling assembly showing the formation of the pulling loop in accordance with the principles of the present disclosure.

A loop 250 having a length L (FIG. 6) is formed at the second end 202 of the enclosure 210. In certain implementations, the length L of the loop 250 is about three inches. In other implementations, the length L of the loop 250 may be greater or less than three inches (e.g., two inches, four inches, five inches, etc.). In some implementations, the loop 250 is formed by folding a section of the enclosure 210 at the second end 202 of the enclosure 210 towards the first end 201. A length of tape 252 is wrapped around (e.g., once, twice, five times, eleven times, fourteen times, etc.) the second end 202 of the enclosure to form the loop 250. Another cable tie 253 cooperates with the tape 252 to secure the formation of the loop 250.

One or more additional cable ties 254, 256 may be inserted at the second end 202 of the enclosure 210 to further secure the loop 250. In some implementations, the cable ties 254, 256 are disposed side-by-side. In other implementations, the cable ties 254, 256 are staggered axially along the enclosure 210. Each cable tie 254, 256 has a locking end and a distal end. The distal end of each cable tie 254, 256 is inserted through the folded section at the second end 202 of the enclosure 210, through an intermediate portion of the enclosure 210, and looped back through the intermediate portion of the enclosure 210, and through the folded section of the enclosure 210. The distal end is locked at the locking end of each cable tie 254, 256.

In some implementations, two cables 120, 130 are packaged in the same pulling assembly 200. In such implementations, the fanout arrangement 134 of the second cable 130 is axially aligned with the fanout arrangement 124 of the first cable 120 in a stacked configuration so that the side holes of the second fanout arrangement 134 align with the side holes of the first fanout arrangement 124. The fanout securement arrangement 230 includes a length of tape 232 that secures the second fanout arrangement 134 to the first fanout arrangement 124. In some implementations, the tape 232 is wrapped around an opposite end of the fanout arrangements 124, 134 from the cable ties 234, 236. For example, the tape 232 may be wrapped around the pigtail end of the fanout arrangements 124, 134 and the cable ties 234, 236 may be disposed at the first end of the fanout arrangements 124, 134.

In other implementations, more than two cables 120, 130 may be packaged in the same pulling assembly 200. In such implementations, two or more fanouts may be stacked together so that the side holes of each fanout are aligned. The fanouts may be secured to the enclosure 210 using multiple cable ties as described above. In certain implementations, the fanouts may be disposed in multiple stacks. The fanouts being taped together to the other fanouts in the respective stack. In some such implementations, each fanout stack is secured to the enclosure 210 using a cable tie that extends through the side holes of the fanouts in the stack. Each fanout stack may be further secured to the enclosure 210 using another cable tie extending around the sidewalls (e.g., tapered sidewalls) of the fanouts in the stack.

To deploy the connectors 128, 138 from the pulling assembly 200, the strip of tape 242 is unraveled and the zip ties 234, 236 are removed from the first end 201 of the enclosure 201. For example, the strip of tape 242 may include a tab or section that was not adhered to the mesh. The tape 242 may be unraveled by pulling on this tab or section. When the tape 242 and zip ties 234, 236 are removed, the enclosure 210 can be pulled (e.g., slid) off the cables 120, 130 like a sock.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. A fiber optic cable assembly comprising:
   a fiber optic cable having a first end and an oppositely disposed second end, the fiber optic cable including:
      a multi-fiber cable section;
      a first fanout arrangement at which the optical fibers are transitioned from the multi-fiber cable section to separate pigtails; and
      a first plurality of optical connectors, each optical connector terminating one of the separate pigtails; and
   a cable pulling assembly coupled to the second end of the fiber optic cable, the cable pulling assembly including:
      an enclosure defining a cavity in which the second end of the fiber optic cable is disposed, the enclosure having a first end and a second end, the second end of the enclosure being folded into a loop, the first end of the enclosure surrounding the first fanout arrangement;
      a first cable tie arrangement securing the second end of the enclosure in the loop; and
      a fanout securement arrangement securing the first fanout arrangement to the first end of the enclosure, wherein the fanout securement arrangement includes at least a first cable tie that extends through opposite side holes in the first fanout arrangement and through both top and bottom portions of the enclosure.

2. The fiber optic cable assembly of claim 1, wherein the enclosure includes a mesh tube.

3. The fiber optic cable assembly of claim 1, wherein the optical connectors are secured within an antistatic bag.

4. The fiber optic cable assembly of claim 3, wherein the antistatic bag encloses the optical connectors and is secured to the pigtails by tape wound around the bag and the pigtails.

5. The fiber optic cable assembly of claim 1, further comprising a second fiber optic cable having a first end and an oppositely disposed second end, the second fiber optic cable including:
   a plurality of second optical fibers forming a second multi-fiber cable section at the first end of the second fiber optic cable;
   at least a second fanout arrangement at which the second optical fibers are transitioned from the second multi-fiber cable section to a second set of pigtails, the second fanout arrangement being secured to the first fanout arrangement using tape; and
   a second plurality of optical connectors, each optical connector of the second plurality terminating one of the pigtails;
   wherein the second end of the second fiber optic cable is disposed in the cavity of the enclosure so that side holes of the second fanout arrangement align with the side holes of the first fanout arrangement, and wherein the first cable tie passes through the first and second side holes in both fanout arrangements.

6. The fiber optic cable assembly of claim 5, wherein the first plurality of optical connectors is disposed toward the first end of the enclosure and wherein the second plurality of optical connectors is disposed toward the second end of the enclosure.

7. The fiber optic cable assembly of claim 6, wherein the separate pigtails of the first fiber optic cable extend along the enclosure from the first end towards the second end and loop back towards the first end.

8. The fiber optic cable assembly of claim 7, wherein the second set of separate pigtails of the second fiber optic cable extend along the enclosure from the first end towards the second end and loop back towards the first end, wherein the second set of separate pigtails loop back at a position located closer to the second end of the enclosure than a position at which the separate pigtails of the first fiber optic cable loop back.

9. The fiber optic cable assembly of claim 7, wherein the second plurality of optical connectors are disposed closer to the second end of the enclosure than any portion of the separate pigtails of the first fiber optic cable.

10. The fiber optic cable assembly of claim 5, wherein the second plurality of optical connectors are secured within a second antistatic bag.

11. The fiber optic cable assembly of claim 5, wherein the second plurality of optical connectors are secured within an antistatic bag with the first plurality of optical connectors.

12. The fiber optic cable assembly of claim 1, wherein the first end of the first fiber optic cable is terminated with an MPO connector.

13. The fiber optic cable assembly of claim 1, wherein the first end of the first fiber optic cable is terminated with a plurality of single optical connectors.

14. The fiber optic cable assembly of claim 1, wherein the first end of the first fiber optic cable is unterminated.

15. A method of installing a cable pulling assembly to a fiber optic cable, the method comprising:
- providing a fiber optic cable having a first end and an oppositely disposed second end, the fiber optic cable including a plurality of optical fibers; and a first fanout arrangement at which the optical fibers are transitioned between a multi-fiber cable section and a plurality of connectorized pigtails;
- inserting at least some of the connectorized pigtails into an antistatic bag; and
- installing a cable pulling assembly at the second end of the fiber optic cable including:
  - wrapping a mesh around the second end of the fiber optic cable to enclose the antistatic bag and the first fanout arrangement within a pulling enclosure;
  - securing the first fanout arrangement to a first end of the enclosure by passing one end of a first cable tie through a top of the mesh into the enclosure, through a first side hole in the first fanout arrangement, out of the enclosure through a bottom of the mesh, across the bottom of the mesh, through the bottom of the mesh into the enclosure, through a second side hole in the first fanout arrangement, and out of the enclosure through the top of the mesh to form a ring with the first cable tie; and
  - folding a second end of the mesh towards the first end and wrapping a first strip of tape around the mesh to form a pulling loop.

16. The method of claim 15, further comprising securing the top and bottom of the mesh together to aid in forming the pulling loop using at least one cable tie.

17. The method of claim 15, further comprising wrapping a second strip of tape around the first end of the mesh.

18. The method of claim 15, wherein inserting at least some of the connectorized pigtails into the antistatic bag comprises inserting all of the connectorized pigtails into the antistatic bag.

19. The method of claim 18, further comprising wrapping a third strip of tape around an open end of the antistatic bag to secure the antistatic bag to the connectorized pigtails.

20. The method of claim 15, further comprising:
- providing a second fiber optic cable having a first end and an oppositely disposed second end, the second fiber optic cable including a second plurality of optical fibers and a second fanout arrangement at which the optical fibers are transitioned between a multi-fiber cable section and a plurality of second connectorized pigtails;
- securing the second fanout arrangement to the first fanout arrangement using a fourth strip of tape;
- inserting the second connectorized pigtails into a second antistatic bag; and
- installing the cable pulling assembly at the second end of the second fiber optic cable.

21. The method of claim 20, wherein installing the cable pulling assembly at the second end of the second fiber optic cable comprises:
- wrapping the mesh around the second end of the second fiber optic cable to enclose the second antistatic bag and the second fanout arrangement within the pulling enclosure; and
- securing the second fanout arrangement to a first end of the pulling enclosure by passing the end of the first cable tie through a first side hole in the second fanout arrangement after passing the end of the first cable tie through the first side hole in the first fanout arrangement, and passing the end of the first cable tie through a second side hole in the second fanout arrangement before passing the end of the first cable tie through the second side hole in the first fanout arrangement.

22. The method of claim 21, wherein wrapping the mesh around the second end of the second fiber optic cable comprises disposing the first antistatic bag closer to the first end of the mesh compared to the second antistatic bag.

23. The method of claim 21, wherein wrapping the mesh around the second end of the second fiber optic cable comprises looping the second end of the second fiber optic cable towards the first end of the second fiber optic cable.

24. A fiber optic cable assembly comprising:
- a first fiber optic cable having a first end and an oppositely disposed second end, the first fiber optic cable including:
  - a first multi-fiber cable section;
  - a first fanout arrangement at which the optical fibers are transitioned from the first multi-fiber cable section to separate pigtails; and
  - a first plurality of optical connectors, each optical connector terminating one of the separate pigtails at the second end of the first fiber optic cable;
- a second fiber optic cable having a first end and an oppositely disposed second end, the second fiber optic cable including:
  - a second multi-fiber cable section;
  - a second fanout arrangement at which the optical fibers are transitioned from the second multi-fiber cable section to separate pigtails; and
  - a second plurality of optical connectors, each optical connector terminating one of the separate pigtails at the second end of the second fiber optic cable; and
- a cable pulling assembly coupled to the second ends of the fiber optic cables, the cable pulling assembly including:
  - an enclosure defining a cavity in which the second ends of the fiber optic cables are disposed, the enclosure having a first end and a second end, the second end of the enclosure being folded into a loop, the first end of the enclosure surrounding the first and second fanout arrangements;
  - a first strip of tape surrounding the first and second fanout arrangements so that side holes of the fanout arrangements are aligned;
  - a second strip of tape surrounding the enclosure to aid in forming the loop at the second end of the enclosure;
  - a first cable tie wrapped around the enclosure adjacent the second strip of tape securing the second end of the enclosure in the loop;
  - a second cable tie threaded through the enclosure from a top side to a bottom side at the loop to aid in securing the second end of the enclosure in the loop;
  - a third cable tie threaded through the enclosure from a top side to a bottom side at the loop adjacent the second cable tie to aid in securing the second end of the enclosure in the loop; and
  - a fanout securement arrangement securing the first and second fanout arrangements to the first end of the enclosure, wherein the fanout securement arrangement includes a fourth cable tie and a fifth cable tie, the fourth cable tie extending through the side holes in the first and second fanout arrangements and through both the top side and the bottom side of the enclosure to aid in securing the fanout arrangements to the first end of the enclosure, the fifth cable tie extending around sides of the fanout arrangements and through both the top side and the bottom side of the enclosure to aid in securing the fanout arrangements to the first end of the enclosure, the fifth cable tie being disposed between the fourth cable tie and the first strip of tape.

* * * * *